United States Patent [19]

McKay et al.

[11] Patent Number: 5,761,005
[45] Date of Patent: Jun. 2, 1998

[54] COMBINATION TRANSDUCER/SLIDER/SUSPENSION

[75] Inventors: Jeffrey Merritt McKay; Henry Shusei Nishihira, both of San Jose; Andrew Ching Tam, Saratoga, all of Calif.

[73] Assignee: International Business Machines Corporation, Armonk, N.Y.

[21] Appl. No.: 926,750

[22] Filed: Sep. 10, 1997

Related U.S. Application Data

[63] Continuation of Ser. No. 692,652, Aug. 6, 1996, abandoned, which is a continuation of Ser. No. 449,631, May 24, 1995, abandoned, which is a division of Ser. No. 202,862, Feb. 25, 1994, abandoned, which is a continuation of Ser. No. 876,533, Apr. 30, 1992, abandoned.

[51] Int. Cl.[6] ............................................ G11B 5/48
[52] U.S. Cl. ................................................. 360/104
[58] Field of Search ........................ 360/97.01, 103–105, 360/121

[56] References Cited

U.S. PATENT DOCUMENTS

| | | | |
|---|---|---|---|
| 3,460,244 | 8/1969 | Metz | 360/121 |
| 3,523,285 | 8/1970 | Alger, Jr. et al. | 360/103 |
| 3,855,625 | 12/1974 | Garnier et al. | 360/102 |
| 4,375,390 | 3/1983 | Anderson et al. | 204/15 |
| 4,450,493 | 5/1984 | Watrous | 360/106 |
| 4,601,782 | 7/1986 | Bianchi et al. | 156/643 |
| 4,624,048 | 11/1986 | Hinkel et al. | 29/603 |
| 4,648,087 | 3/1987 | Scranton et al. | 360/103 |
| 4,670,804 | 6/1987 | Kant et al. | 360/102 |
| 4,698,708 | 10/1987 | Lazzari | 360/103 |
| 4,761,699 | 8/1988 | Ainslie et al. | 360/103 |
| 4,789,914 | 12/1988 | Ainslie et al. | 360/103 |
| 4,965,684 | 10/1990 | Stefansky | 360/97.01 |
| 4,996,623 | 2/1991 | Erpelding et al. | 360/104 |
| 5,001,583 | 3/1991 | Matsuzaki | 360/104 |
| 5,065,271 | 11/1991 | Matsuura et al. | 360/126 |

FOREIGN PATENT DOCUMENTS

| | | |
|---|---|---|
| 59063058 | 8/1984 | European Pat. Off. . |
| 0430407A3 | 9/1990 | European Pat. Off. . |
| 55084028 | 6/1980 | Japan . |
| 60000617 | 5/1985 | Japan . |
| 63086109 | 9/1988 | Japan . |

*Primary Examiner*—Stuart S. Levy
*Assistant Examiner*—David D. Davis
*Attorney, Agent, or Firm*—Leslie G. Murray; Douglas R. Millett

[57] ABSTRACT

A disk drive assembly in which the suspension, slider and transducer are integrated and fabricated to produce a combination assembly. The combination transducer-slider-suspension assembly is batch produced by forming a plurality of the combination assemblies onto a single wafer. The wafer is then diced to separate the assemblies into individual sections. The transducers are deposited onto the wafer and the air bearing surface formed. Conductors to interconnect each transducer with the external circuits are insulated from the wafer and deposited along a path which will form the suspension. A spring-like resilient layer is then deposited over and electrically insulated from the conductors. The wafer is then pattern etched to remove a portion of the wafer backside to form the suspension and provide a transducer/slider combination having an air bearing surface after the wafer is diced to separate the individual combination assemblies. The air bearing surface is defined as the slider surface immediately adjacent the media surface during read/write operation of the disk drive assembly whether or not the slider is flying above or in sliding contact with the media surface during operation. Integrated circuit amplifiers can be deposited at the free end of the conductors prior to separation of individual assemblies.

10 Claims, 5 Drawing Sheets

COMBINATION TRANSDUCER/SLIDER/SUSPENSION

DOCUMENTS INCORPORATED BY REFERENCE

This is a continuation of application Ser. No. 08/692,652, filed on Aug. 6, 1996, now abandoned, which is a continuation of application Ser. No. 08/449,631, filed on May 24, 1995, now abandoned, which is a divisional of application Ser. No. 08/202,862 filed on Feb. 25, 1994, which is a continuation of application Ser. No. 07/876,533 filed on Apr. 30, 1992, now abandoned, in the name of J. M. McKay, H. S. Nishihira and A. C. Tam.

Jones Jr. et al, U.S. Pat. No. 4,190,872, issued on Feb. 26, 1980 and assigned to the assignee of the present invention, to show a thin film inductive transducer useful with the present invention.

Linh, U.S. Pat. No. 3,975,772 issued on Aug. 17, 1976 and assigned to the assignee of the present invention, to show a thin film magnetoresistive head useful with the present invention.

Hinkel et al, U.S. Pat. No. 4,624,048, issued on Nov. 25, 1986 and assigned to the assignee of the present invention, to show a process for making magnetic head sliders useful with the present invention.

Jacobs, U.S. Pat. No. 4,251,841, issued on Feb. 17, 1981 and assigned to the assignee of the present invention, to show a wafer-substrate material useful with the present invention.

Cuzner, et al, U.S. Pat. No. 3,849,800, issued on Nov. 19, 1974 and assigned to the assignee of the present invention, to show a rotary actuator useful in a drive using the present invention.

TECHNICAL FIELD

This invention relates to a magnetic disk system and its recording elements and more particularly to a combination transducer-slider-suspension, an assembly for positioning the combination adjacent to a magnetic media surface of a disk, and a method for making the combination using thin film deposition, etching and wafer-processing techniques.

BACKGROUND OF THE INVENTION

Disk files are information storage devices which utilize at least one rotatable disk with concentric data tracks containing data information, a transducer for reading the data from or writing the data to the various tracks, a slider for holding the transducer adjacent to the track in close proximity to the media, a suspension for resiliently holding the slider and the transducer over the tracks, and a positioning actuator connected to the combination for moving the transducer over the disk surface to the desired track and maintaining the transducer over the track center line during a read or a write operation. The transducer is formed on a surface of or otherwise attached to the slider which is supported in a flying mode by a cushion of air generated by the rotating disk. The suspension provides a high spring stiffness and dimensional stability between the slider and the actuator arm. The suspension is required to maintain the transducer and the slider adjacent to the data surface of the disk with as low a loading force as possible. The actuator positions the transducer over the correct track according to the data desired on a read operation or to the correct track for recording of the data during a write operation. The actuator is controlled to position the transducer over the correct track by shifting the combination generally transverse to the motion of the track.

In conventional disk drives, the transducer and the slider are formed separately from the suspension and then attached to the suspension through an operator-controlled precision attachment procedure. The parts are small and the positioning of each relative to the other must be highly accurate. The transducer must be precisely positioned relative to the track which in turn means that the suspension must be precisely positioned onto the slider. Additionally, the suspension must provide flexibility and pitch and roll motion for the slider relative to the direction of motion of the rotating disk and yet provide resistance to the yaw motion. Any error in the placement of the suspension relative to the slider results in the destruction of both pieces. Even if the suspension and the slider are correctly positioned, the conductor leads to the transducer must then be connected to the transducer and directed along the suspension or connection to an amplifier placed adjacent to the suspension on the actuator. The conductor leads must not add to the spring stiffness of the slider while providing good electrical interconnection. The conductor leads are generally bonded by ultrasonic energy or by soldering, for example, to both the transducer output and the amplifier by an operator. Again, errors can cause destruction of the entire combination.

U.S. Pat. No. 4,670,804 to Kant, et al., assigned to the assignee of the present invention, describes a slider-suspension assembly that includes flexible sheets of material for the suspension to which the conductors for the transducer are deposited and which support the slider and the transducer combination. The stainless steel suspension of the prior art is replaced by the flexible sheet onto which the conductors are deposited. In this patent, the polyimide flexible sheets are formed separately from the slider-transducer combination and then attached to each other by gluing, for instance. There is no showing of a combination transducer-slider-suspension assembly that requires no further connection step between the suspension and the slider.

It is known that the suspension arm can be formed from a polyimide material with the conductors to the transducer deposited directly on the polyimide suspension. U.S. Pat. No. 4,789,914 to Ainslie, et al., assigned to the assignee of the present invention, discloses that contact soldering can be used to connect the suspension containing the conductors directly to a slider having the transducer deposited thereon, with the slider having conductor pads and interconnecting leads deposited onto the slider between the conductor pads and the transducer. Again the slider and transducer are separately produced from the suspension arm and then interconnected later through contact soldering as disclosed in this patent.

U.S. Pat. No. 4,761,699 to Ainslie, et al., assigned to the assignee of the present invention, discloses a method for mechanically attaching a slider to a suspension by the use of reflowed solder balls. A pattern of solder contact pads is formed on the back side of the slider and a similar pattern of solder-wetable regions is formed on the suspension. The slider with the transducers deposited thereon are placed adjacent to the suspension assembly. The solder is reflowed thereby causing the solder balls on the transducer to come in contact with and flow together with the solder balls formed on the regions of the suspension. The mechanical attachment of the slider to the suspension is made simultaneously with the electrical connections of the transducer leads to the further electronics of the amplifier. As with the remainder of the known prior-art, the slider and transducer portion of the combination is produced separately from the suspension-assembly which includes interconnecting conductors. There is no showing of a combination transducer-slider-suspension with conductors nor a method for making the combination.

SUMMARY OF THE INVENTION

The present invention comprises an improved, integrated combination transducer-slider-suspension in which the assembly can be made by batch processing to produce both the transducer and the suspension by depositing the required layers onto a substrate that forms the assemblies after etching. The processes, including the formation of a media contact area or an air bearing surface, are performed prior to dicing for separation into the individual assemblies. Conductors to the transducer can be deposited onto the suspension during the batch processing. Individual integrated circuit amplifiers further may be deposited onto the suspension layer for each transducer before the separation process.

The improvement to an integrated structure comprising a combination transducer-suspension arm-slider is produced by providing a substrate material having an air bearing or contact configuration provided on one surface for flying over or contact with a media and positioning the transducer-slider combination over specific tracks on the media. An air bearing or air bearing surface refers to the surface of the slider parallel and adjacent to the disk or media surface. It includes both surfaces designed to fly above the disk, and those designed for contact recording wherein the slider contacts the disk surface during read/write operations.

A read/write transducer is deposited on the air bearing surface of the substrate and adjacent to the air bearing surface to place the transducer in position to read or write magnetic transitions onto the media. The transducer includes electrical leads which are formed into the substrate material away from the air bearing surface. An insulating layer is deposited on a second side of the substrate and is patterned to leave an area adjacent to the electrical leads with no insulation. Connection studs are deposited in the areas with no insulation for electrical connection to the electrical leads of the transducer. Then conductors are deposited onto the insulation layer and electrically connected to the connection studs and to external control circuitry. A stiffening material is then deposited onto the conductors and the insulation layer. The stiffening material is electrically insulated with respect to at least one of the conductors. The substrate material is then removed from beneath the deposited stiffening material except for the section over the slider wherein the stiffening-material forms the suspension of the combination.

The method for making the combined suspension-slider-transducer assembly which operates in a transducing relationship with a magnetic media includes the step of preparing the substrate for deposition of different layers onto the substrate. At least one thin film transducer is then deposited onto a first surface of the prepared substrate. Rails or pads are then etched into the substrate to define an air bearing slider or contact-recording pads on the first surface of the substrate in a position for producing a flying or contact relationship to the magnetic media to place each deposited transducer in its transducing relationship to the media. Conductive circuitry is then patterned onto a second surface of the prepared substrate for each transducer. The patterned circuitry is then overlaid on the second surface of the substrate with a resilient, yet stiffening material. The first surface of the substrate is then etched adjacent to the etched air bearing surface or contact recording pad of each transducer to remove a section of the substrate. The section removed is adjacent to the air bearing surface and transducer to the patterned conductive circuitry and the overlaid resilient stiffening material. The etched section produces the suspension section of the combination. The substrate is then partitioned into-separate assemblies, each including at least one transducer, one associated air bearing surface, one conductive circuitry, and one suspension section.

In the preferred embodiment, a combination transducer-slider-suspension is made by the process of first depositing thin film transducers or heads onto one surface of a substrate. An air bearing surface is then etched onto the one surface of the wafer adjacent to the transducer to provide a surface which places the transducer in a relationship with the magnetic media to provide the reading and/or writing of magnetic transitions onto the media. The next step is to deposit patterned insulation to permit the electrical connection to the transducer. Conductors are then deposited onto the pattern insulation to interconnect the transducer leads for external connection. The conductors are then coated with a polyimide layer. A relatively stiff, resilient layer is then deposited over the polyimide layer. The substrate is then pattern etched to remove a section of the substrate adjacent to the transducers and air bearing surface along the length of the conductor leads to form a suspension region in the substrate. Each individual slider and suspension assembly including the transducer and the interconnecting conductors are separated from the wafer substrate by a dicing operation. The simultaneous formation of a plurality of the combination assemblies produces a unified product.

It is, therefore, an object of the present invention to provide an enhanced, integrated combination transducer-slider-suspension assembly.

Another object of the present invention is to produce a combination transducer-slider-suspension assembly by a unique process that permits the batch processing of a plurality of the combination assemblies from a single wafer substrate.

Multitrack assemblies having multiple transducers can-be formed using the combination transducer-slider-suspension process by cutting the wafer such that a row of transducers with their sliders are suspended from a single suspension assembly. The single membrane suspension can include the leads conducting the signals to and from each of the transducers. The suspension positions the row of transducers in correct relationship to a plurality of the tracks on a disk media surface.

Another object of the present invention, therefore, is to provide a multiple transducer-slider assembly from a single membrane suspension for covering a plurality of tracks of a magnetic media.

Yet another object of the present invention is to provide a unique process that permits the batch fabrication of a multitrack assembly wherein a plurality of transducer-slider assemblies are suspended from a single membrane suspension.

In the single membrane suspension system, the row of transducers can be separated into individual transducer-slider configurations such that each transducer and its associated slider individually flies over the media in the transducing relationship while still being suspended over a plurality of tracks by the single membrane suspension. The product produced by the unique process of this invention permits the individual separation of the transducer-slider portion while leaving the suspension as a single piece of membrane to position a plurality of the transducer-slider configurations for multitrack recording and reading.

Another object of the present invention is to provide a multitransducer assembly for use in disk drives by the process of forming individual transducer-slider portions suspended by a single membrane suspension, all formed by batch processing on a wafer substrate.

The foregoing and other objects, features and advantages of the invention will be apparent from the following more particular description of preferred embodiments of the invention, as illustrated in the accompanying drawing.

DESCRIPTION OF THE PREFERRED EMBODIMENT

Figure 1A:
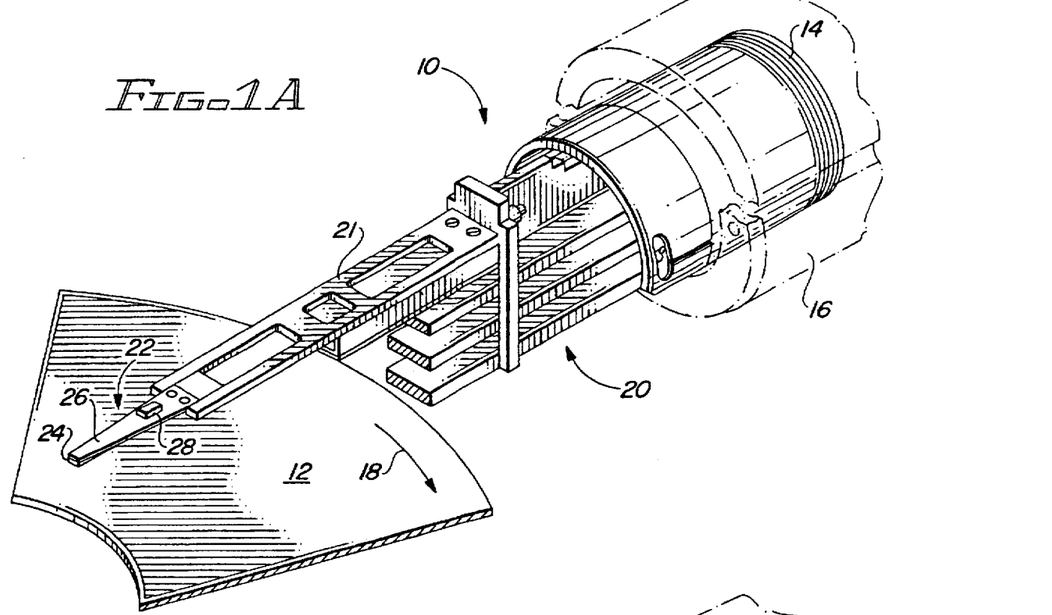
FIGS. 1A and 1B are a perspective view of a combination assembly of the present invention attached for positioning by an actuator in transducing relationship to a disk surface of a disk file.

The preferred embodiments of the present invention are generally for use in large multiple disk drives but will also find use in the single disk drives used generally for personal computers. In FIG. 1A is illustrated a linear actuator 10 and a segment of an associated disk 12 of a data recording disk file. The linear actuator 10 includes a voice coil motor, which is a coil 14 movable with in the magnetic field of a fixed permanent magnet assembly (not shown) having a core within coil 14 and an outer structure supported by housing 16. An actuator arm 20 is attached to the movable coil 14. Attached to the other end of the actuator arm 20 generally is a plurality of arms 21, one shown, each of which support a combination transducer-slider-suspension assembly 22 produced according to the procedure set forth herein. The assembly 22 includes a transducer-slider section 24 and a suspension section 26. The suspension section 26 supports the transducer-slider 24 above the surface of the disk 12 on a bearing or cushion of air generated by the rotation of the disk 12 or can support the transducer-slider 24 in sliding contact with the disk media. The air bearing or air bearing surface refers to the surface of the slider parallel and adjacent to the disk or media surface. It includes both configurations where the slider is designed to fly above the disk, and where the slider is designed to be in sliding contact with the recording media, the disk 12, during operation.

The actuator arm 20 includes the plurality of the arms 21 with each arm 21 supporting the combination assembly 22, each combination assembly 22 associated with each surface of the disk 12. Therefore, disk 12 also has a combination assembly 22 mounted to an arm 21 of the actuator arm 20 on the underside of the disk 12. Further, other combination assemblies are associated with the top and bottom sides of other disks, the transducer access of which is controlled by the actuator 10. The suspension section 26 of the combination transducer-slider-suspension assembly 22 provides a load to the transducer-slider assembly 24 which is generally perpendicular to the surface of the disk 12. This perpendicular load maintains the transducer-slider assembly 24 in contact with the data surface of the disk 12 when the disk 12 is not rotating. During rotation of the disk 12, for sliders designed to fly above the media during operation, the air bearing generated between the transducer-slider assembly 24 and the disk 12 opposes the perpendicular load applied to the transducer-slider assembly 24 by the suspension section 26.

During operation, the transducer-slider assembly 24 is moved to the desired track of the concentric data tracks on the data surface of the disk 12 by means of the coil 14, which moves within the magnetic field of the magnet assembly. Because it is desired to provide rapid access of the transducer-slider assembly 24 from one track to another track for read or write operations, it is necessary that the transducer of the assembly 24 be properly positioned over the desired track and reach that track in a minimum amount of time. It should be noted that while the actuator 10 illustrated in FIG. 1A is a linear actuator which moves the combination assembly 22 in a precisely radial direction transverse to the tracks, other types of conventional disk files utilize a rotary actuator such as is shown in U.S. Pat. No. 3,849,800, assigned to the assignee of the present invention. The rotary actuator-moves the combination assembly of the present invention in an arcuate path which is only generally in the radial direction and which may be a substitute for the linear actuator 10.

Figure 1B:
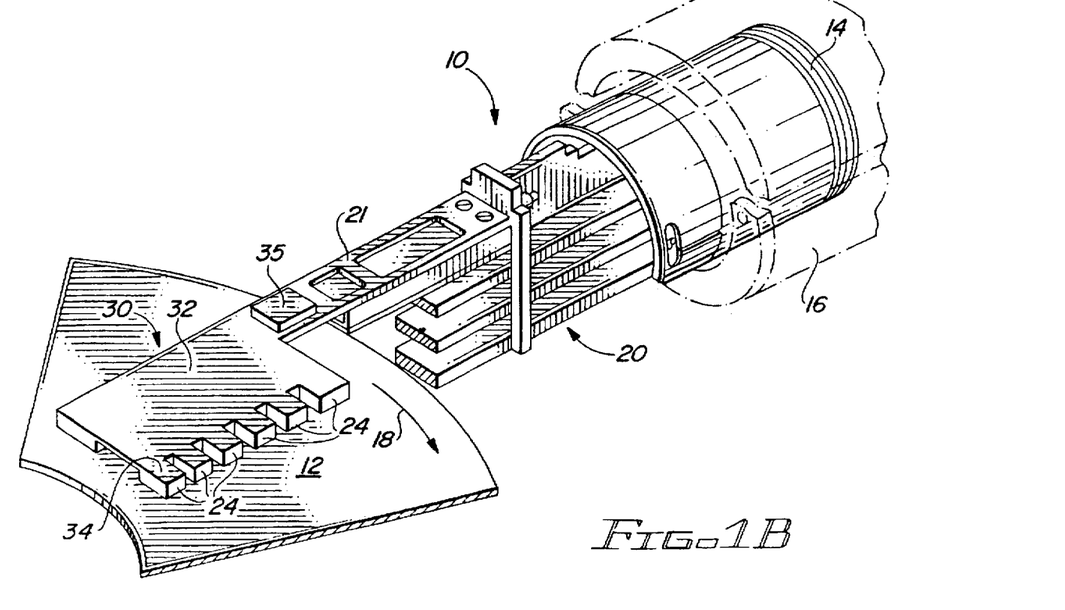

The combination assembly 22 must provide radial stiffness, and have substantial flexibility in the pitch and roll directions as it rides on the air bearing above the data surface of the disk 12. If desired, an integrated circuit assembly 28, such as electronic signal processing circuitry, for example, may also be produced on the suspension section 26 of the combination assembly 22. The integrated circuit amplifier is shown symbolically as reference numeral 28 and will be described as the description proceeds as a further embodiment of the present invention. FIG. 1B shows a further embodiment made according to the present invention for use in a multitrack configuration. Similar reference numerals are given in the description of the figures of the accompanying drawing to identify the same part for ease and understanding the different embodiments of the present invention.

Referring now to FIG. 1B, in lieu of the combination transducer-slider-suspension assembly 26 of FIG. 1A, a multitrack combination assembly 30 is shown attached to the actuator arm 20 and positioned to access a plurality of concentric tracks on the disk 12. In FIG. 1B, the arm 21 of the actuator arm 20 extends further across the radial direction of disk 12. The multitrack combination assembly 30 includes a multitrack suspension section 32 and a multitrack transducer-slider assembly shown generally at reference numeral 34. The multitrack assembly 34 includes a plurality of transducer-slider assemblies 24 for this particular embodiment. As will be described herein below with reference to FIG. 5, the multitrack transducer-slider assembly 34 could comprise a single row of sliders with a plurality of transducers. An integrated circuit assembly 35 could be placed or formed onto the multitrack combination assembly 32 to provide read and write capability for all of the transducers of the assemblies 24.

During the operation of the disk file according to FIG. 1B, the combination assembly 30 need not move as far radially across the disk, since the plurality of transducer-slider assemblies 24 cover a significant portion of the total number of tracks on the disk surface of the disk 12 at a given position over the disk 12.

The number of transducer-slider assemblies could be any number from two to the total number of tracks on the disk 12. The actuator 10 thereby may only be required to move half of the distance of a single transducer-slider assembly, for example, as shown in FIG. 1A up to-merely actuating the combination assembly 30 from off-track to on-track positioning. Further discussion of the multitrack combination assembly 30 of FIG. 1B is provided below with reference to FIGS. 3, 4 and 5. An enlarged configuration of the transducer-slider assembly 24 of FIGS. 1A and 1B is shown in FIG. 2.

Figures 2, 6A:
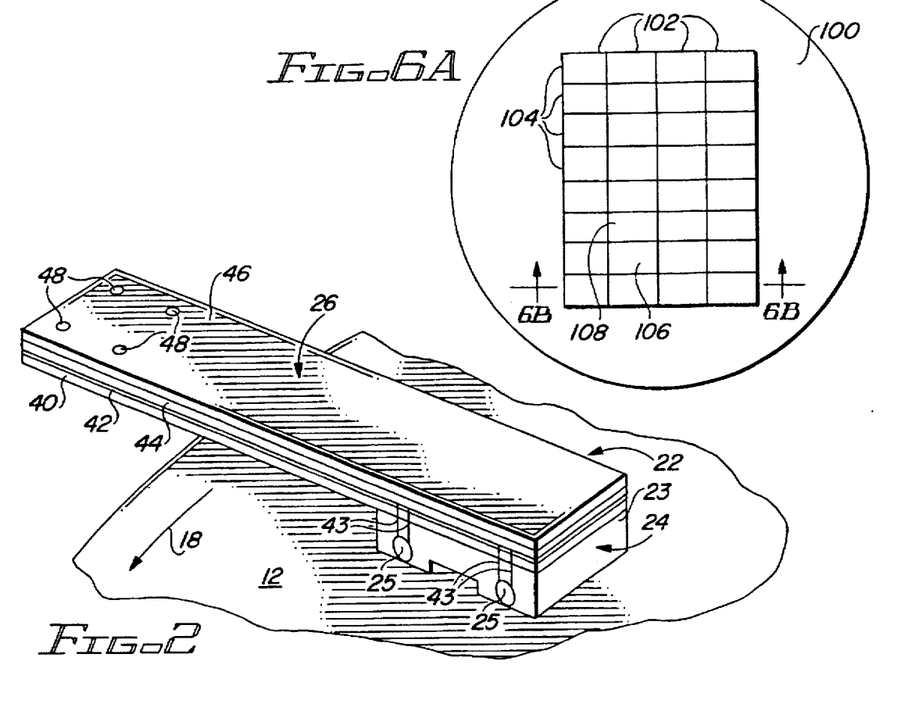
FIG. 2 is a perspective view of a single combination transducer-slider-suspension assembly produced in accordance with the present invention as illustrated in FIG. 1A.
FIGS. 6A–6J illustrate the fabrication process for the combination transducer-slider-suspension according to the invention as shown in FIGS. 2 and 3.

Referring now to FIG. 2, the opposite side of the combination assembly 22 is shown positioned over the disk 12. The rotation of the disk 12 is shown by the arrow 18 to be in the-direction where the transducers 25 are located either on the trailing edge of the transducer-slider assembly 24, a so called vertical head, or are located on the air bearing surface which would constitute a horizontal head. The suspension section 26 is deposited over an entire section of a wafer as will be described below. A portion of the wafer becomes the slider 23 of the transducer-slider assembly 24. Two transducers 25 are shown on the slider 23, but it is possible that only one is used for operation with the track of the disk 12. Two or more transducers 25 are deposited during fabrication in order to increase the yield since only one transducer 25 need be in operation to produce a workable combination assembly 22.

The suspension section 26 includes an insulation layer 40, a conductive circuitry layer 42, a dielectric layer 44, and a structural suspension layer 46 which could be a plated nickel-iron alloy, or a sputtered beryllium copper layer or a sputtered stainless steel layer. Conductor leads 43 interconnect the transducer 25 to the conductor circuitry layer 42. Electrical connection pads 48 are provided to interconnect with the amplifier located adjacent thereto-or could be the position in which an integrated circuit amplifier, such as integrated circuit amplifier 28, is deposited together with the remaining layers as will be discussed below with reference to FIG. 6. The insulation layer 40 provides electrical insulation between the conductor layer 42 and the possibly conductive substrate of the slider 23. The dielectric layer 44, such as a polyimide material, for example, provides insulation for the conductive circuit layer 42 from the metal structural suspension layer 46. The dielectric layer 44 together with the structural suspension layer 46 provides the suspension support which holds the transducer-slider assembly 24 in position over the desired track of disk 12. As stated previously, the suspension section 26 must provide a spring action to hold the transducer-slider section 24 in place over the disk 12 while allowing the pitch and roll motion to enable the transducer-slider section 24 to follow the surface of the disk 12 yet preventing or minimizing the yaw motion which would possibly place the transducer 25 out of the required transverse position with respect to the tracks.

Figure 3:
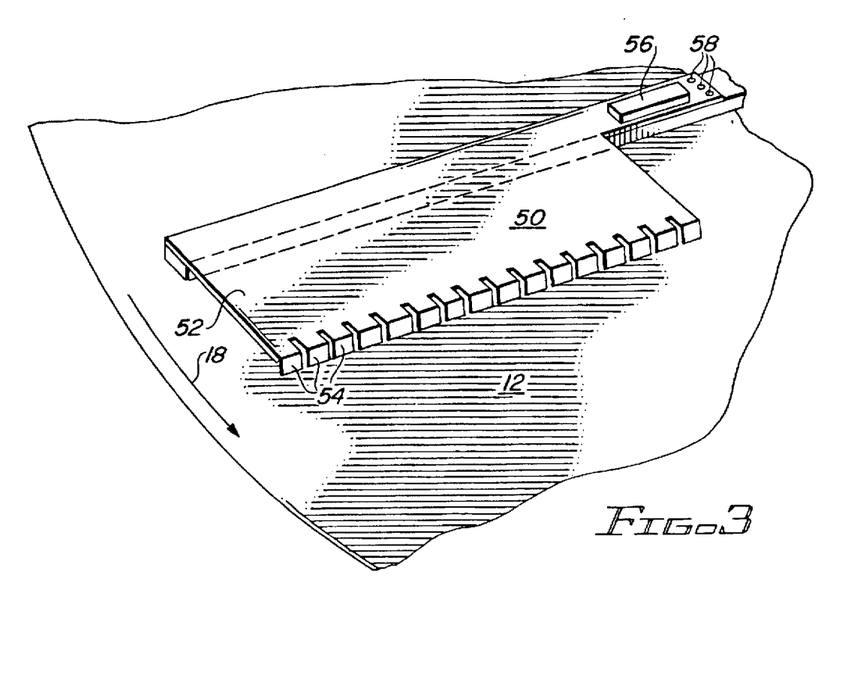
FIG. 3 is a perspective view of a combination transducer-slider-suspension assembly having a plurality of transducer-sliders suspended by a single membrane suspension and adapted for use in a disk file as shown in FIG. 1B.

A further embodiment of the present invention is shown in FIG. 3. In FIG. 3 a combination transducer-slider-suspension 50 is shown attached to the arm 21 of the actuator arm 20 (see FIG. 1A). The combination assembly 50 includes a membrane suspension section 52 supporting a plurality of transducer-slider sections 54 positioned adjacent to the surface of the disk 12. The rotation of the disk 12 is in the direction shown by the arrow 18. Thus the transducer-slider section 54 is placed at the trailing edge of the suspension section 52. An integrated circuit 56 is shown as part of the combination assembly 50 and can be deposited together with the other layers as will be discussed further for FIGS. 6A-6J. Alternatively, the integrated circuit 56 clan be mounted onto the membrane combination assembly in the well known manner. Electrical conductor pads 58 interconnect the conductive circuitry (not shown) of the combination assembly to the rest of the disk drive. The conductive circuitry interconnects the transducer-slider section 54 with the integrated circuit 56 and integrated circuit 56 in turn directs its output to the electrical conductive pads 58. The conductor circuitry for the transducer-slider section are placed internal to the combination assembly 50 in a manner similar to that shown for the single combination assembly 22 of FIG. 2. The internal lines of the circuitry are not shown since the multiplicity of lines would tend to confuse rather than explain. Further details of the transducer-slider section 54 is shown in FIG. 4.

Figure 4:
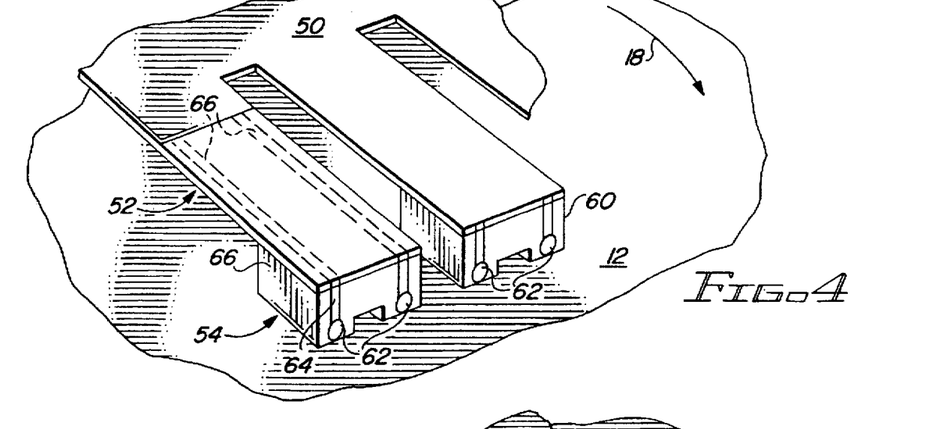
FIG. 4 is a perspective view of the relationship of the transducer-slider assembly with the single membrane suspension as shown in FIG. 3.

Referring to FIG. 4, the transducer-slider section 54 includes a slider 60 and one or more transducers 62. Conductors 64 interconnect the transducers 62 to a conductor circuitry 66 which extends along the suspension section 52 of the combination assembly 50. The transducer-slider section 54 comprise a plurality of individual sliders 60 and transducers 62. The membrane combination assembly 50 may be produced in a similar manner to the combination assembly 22 of FIG. 2 and essentially can comprise the same layers for the suspension section. Thus, the suspension section 52 of the membrane combination assembly 50 of FIG. 4 can comprise the same layers as that set forth for the suspension section 26 of the combination assembly 22. A further embodiment of the membrane combination assembly 50 of FIG. 3 is shown in FIG. 5.

Figure 5:
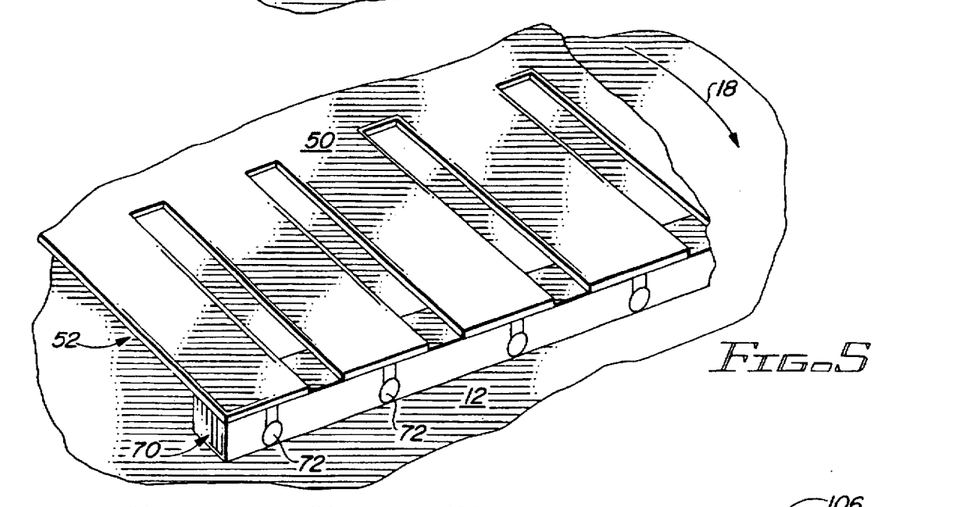
FIG. 5 is a perspective view of a row of transducers mounted onto a slider assembly and suspended according to the embodiment of FIG. 3.

In FIG. 5, the membrane combination assembly 50 is similar in construction as that shown for FIGS. 3 and 4 except that a transducer-slider section 70 comprises a plurality of transducers 72 deposited onto a row section from a wafer substrate. The individual slider sections are not separated but are interconnecting thus dispensing with the dicing operation that separates the individual sliders. An air bearing surface can be formed into the row in the same manner as for the individual sliders. A more complete description of the operation and manufacture will be described later. The construction of the membrane combination assembly 50 of FIG. 5 is in the same manner as that discussed for the membrane combination assembly 50 of FIG. 3 and FIG. 4 and can comprise the same layers. The membrane combination assembly 50 suspends the transducer-slider row 70 over the surface of the disk 12 at the trailing edge of the suspension section 52. The disk 12 rotates in the direction of the arrow 18 in the same manner as discussed previously for FIGS. 3 and 4.

A step by step method of making the combination assemblies shown in FIGS. 1–5 is described in FIGS. 6A–6J for the instance where the transducer is a horizontal head. In FIG. 6A, a wafer substrate 100 is shown having a plurality of the combination assemblies 22, for instance, deposited thereon in a plurality of rows 104 and a plurality of columns 102. According to the principles of the present invention, the thickness of the wafer 100 is chosen to be approximately equal to the desired width of the finished suspension slider combination. The wafer 100 is shown with a plurality of the combination assemblies, it being known that more or less than the number of rows 104 and columns 102 as shown can be produced. The number is dependent on the size of the wafer and on the size of the individual combination assemblies. FIG. 6A shows the wafer layout of the combination assemblies.

Figure 6B:
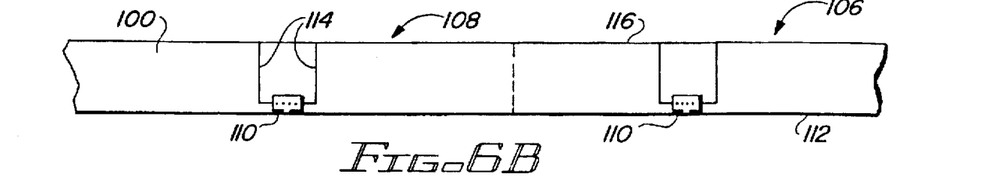
Figure 6C:
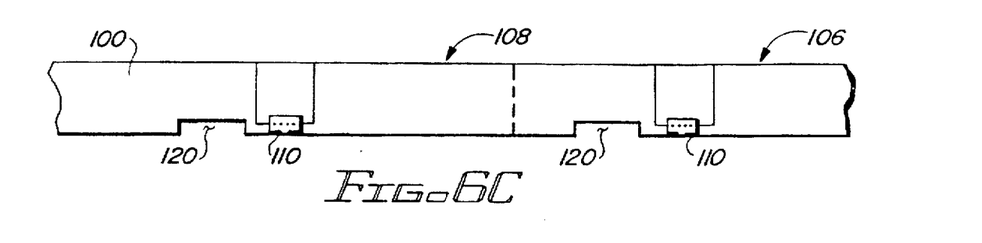

FIG. 6B shows a cross-section of one row 104 with two columns 102. Thus in FIG. 6B can be shown two combination assemblies 106 and 108 taken from FIG. 6A. A step in the process shown in FIG. 6B, a plurality of transducers 110 are produced on one side 112 of the wafer 100. Through conductors 114 are formed through the wafer 100 to a second surface 116 of the wafer 100. The through conductors can be formed by a reactive ion etch process as disclosed in U.S. Pat. No. 4,601,782, assigned to the assignee of the present invention and then plated with copper. The horizontal head transducers 110 can be produced on the first surface 112 of the wafer 100 in the manner as shown in U.S. Pat. No. 4,698,708 which shows the deposition of what is referred to as an integrated circuit transducer. Further, the transducer 110 can be a standard one-turn construction which again would comprise the deposition of layers onto the first surface 112 of the wafer 100. The next step, as shown in FIG. 6C, is the etching of the air bearing surface pocket 120 into each of the columns 106 and 108 and adjacent to the transducer 110. The air bearing surface pockets 120 can be formed by reactive ion or laser induced etching, or by mechanical tools to carve out the section. In the embodiment shown in the figures, a two-rail slider is assumed. The air bearing surface pocket 120 could be a negative pressure or self loading slider such as is disclosed in U.S. Pat. No. 3,855,625, assigned to the same assignee as this application. Reactive ion etching to form air bearing surface pockets is well known in the art as described in U.S. Pat. No. 4,375,390, assigned to the assignee of the present invention.

Figure 6D:
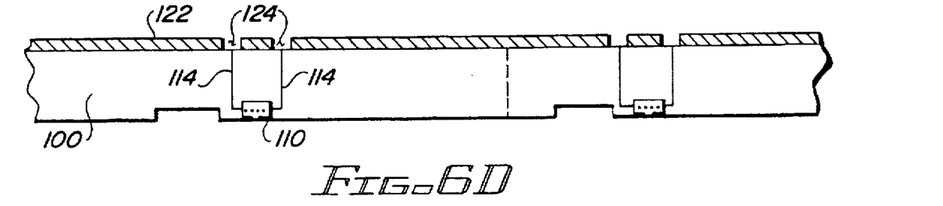

Referring now to FIG. 6D, the next step in the process is to deposit and pattern an insulation layer 122 onto the second surface 116 of the wafer. The insulation layer 122 includes openings 124 to leave the through conductors 114 exposed at the second surface 116 of the wafer 100. The insulation layer 122 is patterned over the entire section of the combination assembly to permit interconnection of all of the transducers 110 to the conductive circuitry shown deposited in FIG. 6E.

Figure 6E:
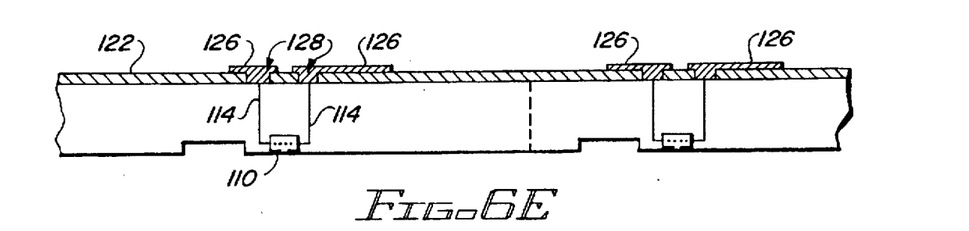

In FIG. 6E, a layer of copper 126 is deposited to form the conductive patterns along the length of the suspension section. Copper studs 128 are also deposited to interconnect the leads 114 of the transducer 110 to the copper conductors 126. The material forming the conductor circuitry 126 can be formed by plating copper, for instance, or by sputtering gold or other well known electrically conductive materials to form the interconnections between the transducer leads 114-and the output at the end of the suspension section.

Figure 6F:
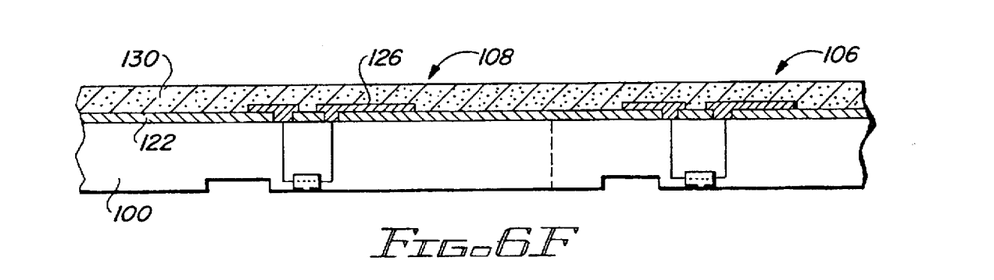

In FIG. 6F, a dielectric layer of a polyimide material 130, for instance, is then placed over the insulation layer 122 and the conductor circuitry 126., The polyimide layer 130 insulates the conductor circuitry 126 from the remaining suspension layers. The polyimide layer 130 can provide stiffness to the suspension section as discussed in the aforementioned U.S. Pat. No. 4,670,804 or merely an insulation factor for the conductive circuitry 126. Thus the polyimide dielectric layer 130 could be formed by spin coating the material across the surface of the wafer or the polyimide layer 130 could be preformed and adhered over the other layers to add stiffness to the suspension section, if desired.

Other types of insulating dielectrics could be used instead of the polyimide layer. The polyimide material is preferred because of its dielectric and inert properties and because of the stiffness which can be obtained from the material.

Figure 6G:
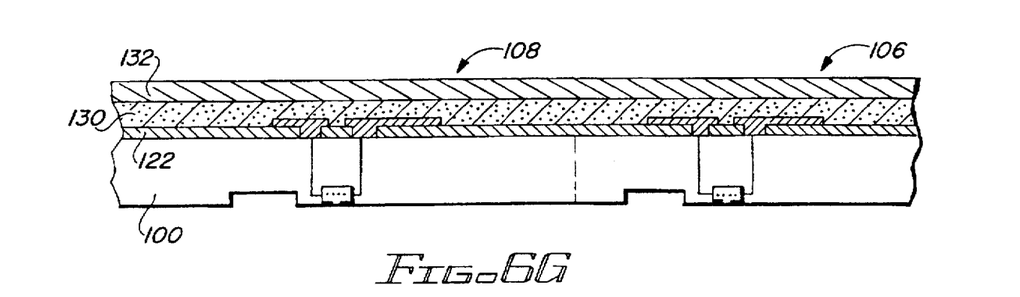

FIG. 6G shows the next step in the process wherein a structural suspension layer 132 is deposited over the polyimide layer 130. The structural suspension layer 132 can be produced by placing a conductive seed layer (not shown) by sputtering over the polyimide layer 130 and then plating a nickel-iron alloy, for instance, onto the seed layer. Alternatively, the structural suspension layer 132 could be formed by sputtering a beryllium copper or stainless steel layer, for example, over the entire surface of the wafer. The structural suspension layer 132 provides additional suspension support to the polyimide layer 130 or can provide the entire structural suspension support for suspending the slider-transducer assembly as shown in FIG. 1A.

Figure 6H:
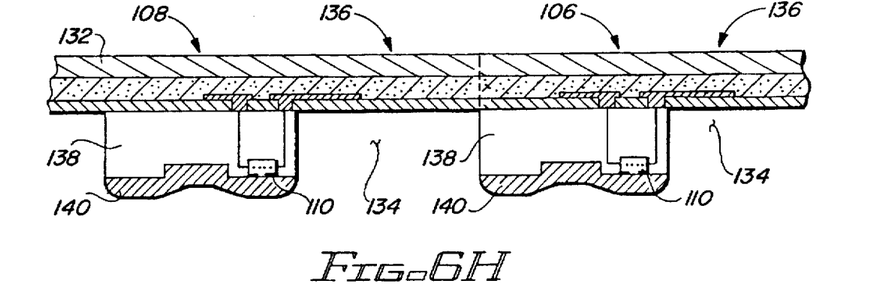
Figure 6I:
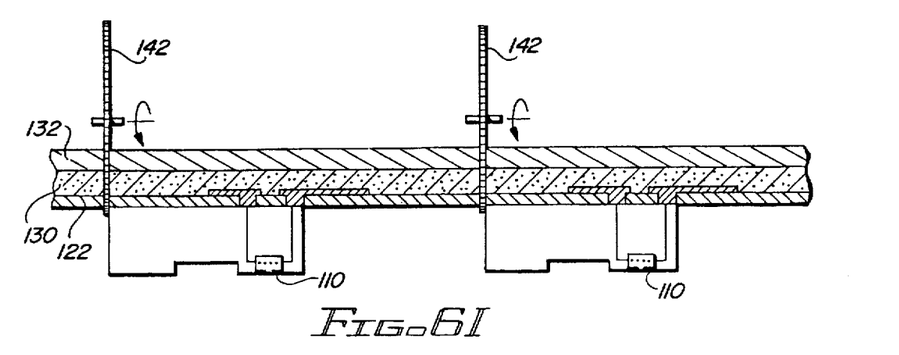

The next step in the batch process for forming the combination assembly is shown in FIG. 6H wherein the wafer area 134 beneath a suspension section 136 is etched away to produce the individual slider assemblies 138 and the suspension section 136 having a desired thickness profile to provide the desired suspension characteristics. A protective coating 140 is shown placed over the transducer-slider section 138 to protect that section from the etching process, for instance when reactive ion etching is used to etch away the wafer section 134. The protective coating 140 could be a photoresist as is well known in the prior art. The etching away of the wafer substrate at the section 134 is well known in the art as shown in U.S. Pat. No. 4,624,048, assigned to the assignee of the present invention. In the step shown in FIG. 6H, the individual combination assemblies are defined to produce the combination assemblies 106 and 108. Each combination assembly includes the suspension section 136, the slider 138, and a transducer 110.. The protective-coating 140 is removed after the etching process utilizing a well known process. The individual combination assemblies 106 and 108 are separated as shown in FIG. 6I by dicing wheels 142, for instance, to separate the rows and columns as shown in the wafer 100 of FIG. 6A. The individual combination assemblies 22 of FIG. 2, for instance, can be produced exactly as shown in the steps of FIGS. 6A-6I. Likewise, the membrane combination assembly 50 of FIGS. 3 and 4 can be produced in the same fashion. The only difference is that the suspension section 52 (see FIG. 3) will cover an entire column 102 and will thereby include a plurality of the slider-suspension assemblies 138. The wafer will be diced apart to create individual columns while the wafer will not be split into individual rows and columns to produce the individual items as previously discussed. The conductive patterns will be likewise individually produced in order, again, to interconnect the transducers to the external connection or the integrated circuit 56 as shown in FIG. 3. One entire row 104 as shown in FIG. 6A can produce the embodiment as shown in FIG. 5 in that the transducers 72 and the slider row 70 can be produced in the same manner as discussed in FIGS. 6A-6I with the production only of one row on a wafer, rather than a plurality of rows and columns.

Figure 6J:
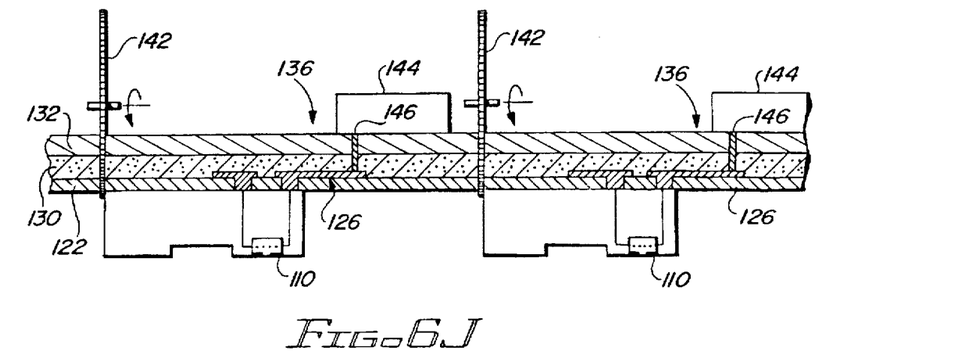

In FIG. 6J, an integrated circuit driver 144 can be deposited onto each suspension section 136, either before or after the etching process of FIG. 6H. The layers and procedures required are well known in the prior art to produce the electronics to drive the transducer 110. If desired, the integrated circuit 144 could be separately formed and then adhered by soldering, for instance, to each suspension section 136. The integrated circuit 144 of FIG. 6J is essentially the integrated circuit assembly 28 as shown in FIG. 1A. Conductor 146 can interconnect the driver circuit 144 to the conductors 126. The location and interconnection of the integrated circuit 144 as described herein is only illustrative, for specific slider designs and materials, other locations and interconnection methods may be utilized. For example, if the slider 138, i.e., the wafer 100, is of silicon or other semiconductor material, the integrated circuit may be fabricated directly on the back or opposite side of the air bearing surface prior to deposition of the insulation layer 122 as shown in FIG. 6D.

While the invention has been particularly shown and described with reference to preferred embodiments thereof, it will be understood by those skilled in the art that various changes in form and detail may be made therein without departing from the spirit and scope of the invention. For instance, a transducer may be produced onto the wafer such as is described in U.S. Pat. No. 4,190,872, assigned to the assignee of the present invention. The wafer may be made of material such as is the subject matter of the Jacobs U.S. Pat. No. 4,251,841, entitled "Magnetic Head Slider Assembly" and assigned to the assignee of the present invention. The suspension section according to the preferred embodiments could be a dual layer of a polyimide material and a metal layer deposited thereon to provide sufficient resiliency and stiffness as required by a suspension assembly. It should be noted that the suspension assembly could be produced in a single layer if the correct thickness and stiffness were obtained in the single layer. It is also well understood that many electrically conductive materials are available to form the conductive circuitry and the transducer leads. Copper or gold are the preferred materials but many others are available as is well known in the art. While air bearing surface sliders are discussed herein, the present invention also includes contact recording sliders wherein the air bearing surface of the slider is any suitable surface or pad that can be maintained in sliding contact with the media during operation over the expected lifetime of the head-disk assembly. Further, while horizontal heads are shown in the preferred embodiment, the present invention is also applicable to vertical heads wherein the slider-suspension combination is produced by the disclosed process without the transducer and the vertical style transducer is separately produced and bonded to the slider-suspension combination. It should also be evident that the linear actuator 10 could be a rotary type actuator rather than a linear actuator without departing from this invention. The invention claimed herein is set forth in the following claims.

What is claimed is:

1. A disk drive assembly comprising:

a housing;

magnetic storage media mounted for rotary motion in said housing, said magnetic storage media having data tracks provided on at least one surface thereof;

a device for rotating said magnetic storage media in said housing;

an actuator arm positioned in said housing in proximity to said magnetic storage media;

a unitary one-piece transducer-slider-suspension having one end thereof attached to said actuator arm, said transducer-slider-suspension comprising:

a resilient elongated suspension section having a layered structure defining a solid body, said suspension section including a deposited insulation layer, a deposited conduction layer overlying said insulation layer, a deposited dielectric layer overlying said conduction layer and a deposited metallic layer overlying said dielectric layer, said conduction layer being located between the insulation layer and the dielectric layer, said conduction layer defining electrical conducting members extending the length of said suspension section;

said suspension section having a thicker portion forming a slider opposite said conduction layer at a free end thereof opposite said one end, said insulation layer separating said slider from said conduction layer, said slider having an air bearing surface defined on a surface thereof, the metallic structure layer being a continuous piece which extends from a rigid attachment to the actuator arm to a position overlying the slider, and shaped to completely overlie the underlying layers in order to provide support; and at least one transducer formed on a surface of said slider adjacent said air bearing surface, said transducer disposed for operation in a transducing relationship with said magnetic storage media, said transducer including conductor leads connected to said electrical connecting members via conductive leads located in apertures which run through the interior of the slider and the insulating layer for electrically coupling said transducer to external circuitry.

2. A disk drive assembly as defined in claim 1 wherein said slider includes two transducers formed on said surface adjacent said air bearing surface.

3. A disk drive assembly as in claim 1 wherein said suspension section has a predetermined thickness profile.

4. A disk drive assembly as defined in claim 3 wherein said predetermined thickness profile comprises a uniform thickness throughout said suspension section.

5. A disk drive assembly as defined in claim 1 further comprising an amplifier means formed on a surface of said suspension section and electrically connected to said electrical connecting members.

6. A disk drive assembly as defined in claim 1 wherein said suspension section comprises a membrane suspension section.

7. A disk drive assembly as defined in claim 6 wherein said slider and transducer form a unit, a plurality of said slider/transducer units formed at said free end of said membrane suspension section.

8. A disk drive assembly as defined in claim 7 wherein said plurality of slider/transducer units are formed along an edge of said membrane suspension section extending from said free end of said suspension section, said transducers formed on a trailing surface of said slider adjacent said air bearing surface.

9. A disk drive assembly as defined in claim 8 wherein said membrane suspension section is slotted between each of said plurality of slider/transducer units.

10. A disk drive assembly as defined in claim 8 wherein each individual unit of said slider/transducer units cooperate with data recorded on at least one data track on said magnetic storage media.

* * * * *